US010611871B2

(12) United States Patent
Visger et al.

(10) Patent No.: US 10,611,871 B2
(45) Date of Patent: Apr. 7, 2020

(54) STAR POLYMERS AND COMPOSITIONS THEREOF

(71) Applicant: The Lubrizol Corporation, Wickliffe, OH (US)

(72) Inventors: Daniel C. Visger, Mentor, OH (US); Mark Davies, Shanghai (CN); David Price, Littleover (GB); Marina Baum, Chagrin Falls, OH (US); Barton J. Schober, Perry, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 33 days.

(21) Appl. No.: 15/348,364

(22) Filed: Nov. 10, 2016

(65) Prior Publication Data
US 2017/0058072 A1  Mar. 2, 2017

Related U.S. Application Data

(60) Division of application No. 11/738,572, filed on Apr. 23, 2007, now Pat. No. 9,522,972, which is a continuation-in-part of application No. PCT/US2005/038146, filed on Oct. 21, 2005.

(60) Provisional application No. 60/621,875, filed on Oct. 25, 2004.

(51) Int. Cl.
C08F 293/00 (2006.01)
C10M 145/14 (2006.01)
C08G 83/00 (2006.01)

(52) U.S. Cl.
CPC ........ C08F 293/005 (2013.01); C08F 293/00 (2013.01); C08G 83/005 (2013.01); C10M 145/14 (2013.01); C08F 2438/01 (2013.01); C08F 2438/03 (2013.01); C08F 2500/04 (2013.01); C10M 2205/04 (2013.01); C10M 2209/084 (2013.01); C10M 2217/024 (2013.01); C10M 2217/028 (2013.01); C10N 2220/021 (2013.01); C10N 2220/022 (2013.01); C10N 2220/029 (2013.01); C10N 2230/02 (2013.01); C10N 2230/68 (2013.01); C10N 2240/042 (2013.01)

(58) Field of Classification Search
CPC .................. C08F 293/005; C10N 2220/029
See application file for complete search history.

(56) References Cited

U.S. PATENT DOCUMENTS

| 4,695,607 A | * | 9/1987 | Spinelli ............... C08F 290/046 525/272 |
| 5,552,491 A | * | 9/1996 | Mishra ................. C08F 297/02 525/299 |
| 5,587,431 A | | 12/1996 | Gridnev et al. |
| 5,955,405 A | * | 9/1999 | Liesen ................. C08F 220/18 252/79 |
| 6,323,164 B1 | * | 11/2001 | Liesen ................. C10M 149/04 508/469 |
| 6,369,162 B1 | | 4/2002 | Visger et al. |
| 6,391,996 B1 | | 5/2002 | Scherer et al. |
| 6,403,745 B1 | | 6/2002 | Scherer et al. |
| 6,403,746 B1 | | 6/2002 | Roos et al. |
| 6,479,584 B1 | | 11/2002 | Nakagawa |
| 6,512,081 B1 | | 1/2003 | Rizzardo et al. |
| 6,545,095 B1 | | 4/2003 | Solomon |
| 6,610,801 B1 | | 8/2003 | Scherer |
| 6,642,318 B1 | | 11/2003 | Chiefari et al. |
| 6,720,395 B2 | | 4/2004 | Nakagawa |
| 2002/0147118 A1 | | 10/2002 | Visger et al. |
| 2004/0171777 A1 | | 9/2004 | Le et al. |
| 2005/0272617 A1 | | 12/2005 | Camenzind et al. |
| 2006/0189490 A1 | | 8/2006 | Dardin et al. |
| 2009/0118150 A1 | | 5/2009 | Baum et al. |

FOREIGN PATENT DOCUMENTS

| EP | 0936225 | 5/2004 | |
| EP | 0979834 | 7/2004 | |
| JP | 2004169029 A | * 6/2004 | ............ C08F 220/18 |
| WO | 9623012 | 8/1996 | |
| WO | 9958588 | 11/1999 | |
| WO | 0002939 | 1/2000 | |
| WO | 2000024795 | 5/2000 | |
| WO | 2005056739 | 6/2005 | |
| WO | 2007025837 | 3/2007 | |

OTHER PUBLICATIONS

Machine Translation of JP-2004169029-A (Year: 2004).*
Baek et al., "Star Shaped Polymers by Metal-Catalyzed Living Radical Polymerization," Macromolecules 2001, 34, pp. 215-221, Dec. 15, 2000.
Baek, et al., "Core Functionalized Star Polymers by Transition Metal-Catalyzed Living Radical Polymerization, 1," Macromolecules 2001, 34, pp. 7629-7635, Sep. 25, 2001.
Baek, et al., "Core Funcationalized Star Polymers by Transition Metal-Catalyzed Living Radical Polymerization, 2," Macromolecules 2002, 35, pp. 1493-1498, Jan. 29, 2002.

* cited by examiner

Primary Examiner — Ellen M McAvoy
Assistant Examiner — Ming Cheung Po
(74) Attorney, Agent, or Firm — Eryn Ace Fuhrer; Teresan W. Gilbert

(57) ABSTRACT

The invention provides a composition comprising: (a) a star polymer comprising: (i) a core portion comprising a polyvalent (meth) acrylic monomer, oligomer or polymer thereof or a polyvalent divinyl non-acrylic monomer, oligomer or polymer thereof; and (ii) at least two arms of polymerized alkyl (meth)acrylate ester; and (b) an oil of lubricating viscosity, wherein the core portion further comprises a functional group of formula (I):

—$CH_2$—$C(R^1)(C(=O)A)$-Y—  (I)

wherein $R^1$ is hydrogen, a linear or branched alkyl group containing 1 to 5 carbon atoms; A is nitrogen or oxygen; and Y is a free radical leaving group selected from the group consisting of one or more atoms or groups of atoms which may be transferred by a radical mechanism under the polymerisation conditions, a halogen, an —O—N= group and an —S—C(=S)— group. The invention further provides the use of the composition in an oil of lubricating viscosity as a dispersant, a viscosity modifier or a precursor to a dispersant viscosity modifier.

17 Claims, No Drawings

STAR POLYMERS AND COMPOSITIONS THEREOF

CROSS REFERENCE TO RELATED APPLICATION

This application is a divisional of application Ser. No. 11/738,572 filed on Apr. 23, 2007, which was a continuation-in-part of Application No. PCT/US05/38146 filed on Oct. 21, 2005, which claims the benefit of U.S. Provisional Application No. 60/621,875 filed on Oct. 25, 2004.

FIELD OF INVENTION

The present invention relates to a lubricating composition containing a star polymer.

BACKGROUND OF THE INVENTION

The use of polymers as a rheology modifier (or viscosity modifier) or as a dispersant in an oil of lubricating viscosity is well known. Typically polymers include polymethacrylates with physical properties that have high and low temperature viscometrics as well as shear stability. The polymethacrylate polymers are generally linear and as a consequence have a set relationship of shear stability to molecular weight. Molecular weight relates to the polymer's thickening efficiency.

Attempts to prepare a star polymer from acrylic or methacrylic monomers with molecular weights and other physical properties commercially useful for a lubricating additive have been disclosed in International publication WO96/23012 A1 and European patent applications EP 979 834 A2 and EP 936 225 A1. The star polymers of WO96/23012 and EP 936 225 are prepared by anionic polymerisation techniques. It is well known that anionic polymerisation processes require carefully controlled conditions to make a star polymer. For instance the process requires highly pure solvents, an inert atmosphere substantially free of water and a low reaction temperature. The process also requires the use of alkali metal carbanionic initiators.

PCT application WO 00/02939 A1 discloses a process for preparing microgels and star polymers. The process includes atom transfer radical polymerisation and reversible addition fragmentation transfer polymerisation (RAFT). The microgel is formed from a prepolymer reacting with a multi-olefinic monomer and the product formed has a weight average molecular weight of $10^4$ to $10^8$.

The star polymers of EP 979 834 require from 5 to 10 weight percent of a C16 to C30 alkyl (meth)acrylate and from 5 to 15 weight percent of butyl methacrylate. A viscosity index improver with a C16 to C30 alkyl (meth) acrylate monomer present at 5 weight percent or more has reduced low temperature viscosity performance because the polymer has a waxy texture.

Processes including atom transfer radical polymerisation (ATRP) have been employed to prepare linear poly(meth) acrylate polymers, and these are disclosed in U.S. Pat. Nos. 6,391,996 B1, 6,403,745 B1, 6,403,746 B1 and 6,610,801 B1.

It would be advantageous to have a star polymer derived from a (meth)acrylic monomer with viscosity index improving characteristics and acceptable shear stability. The present invention provides a star polymer with viscosity index improving characteristics and acceptable shear stability.

SUMMARY OF THE INVENTION

The invention provides a composition comprising:
(a) a star polymer comprising:
(i) a core portion comprising a polyvalent (meth) acrylic monomer, oligomer or polymer thereof or a polyvalent divinyl non-acrylic monomer, oligomer or polymer thereof; and
(ii) at least two arms of polymerized alkyl (meth)acrylate ester; and
(b) an oil of lubricating viscosity,
wherein the core portion further comprises a functional group of formula (I):

wherein
R¹ is hydrogen, a linear or branched alkyl group containing 1 to 5 carbon atoms;
A is nitrogen or oxygen; and
Y is a free radical leaving group selected from the group consisting of one or more atoms or groups of atoms which may be transferred by a radical mechanism under the polymerisation conditions, a halogen, an —O—N═ group or an —S—C(═S)— group.

The invention provides a composition comprising:
(a) a star polymer comprising:
(i) a core portion comprising a polyvalent (meth) acrylic monomer, oligomer or polymer thereof or a polyvalent divinyl non-acrylic monomer, oligomer or polymer thereof; and
(ii) at least two arms of polymerized alkyl (meth)acrylate ester; and
(b) an oil of lubricating viscosity,
wherein the core portion further comprises a functional group of formula (Ia):

wherein
E is independently another part of the core, a polymeric arm or to a monomeric species, or another structural unit as defined by formula (Ia);

R[1] is hydrogen, a linear or branched alkyl group containing 1 to 5 carbon atoms;

A is nitrogen or oxygen; and

Y is a free radical leaving group selected from the group consisting of one or more atoms or groups of atoms which may be transferred by a radical mechanism under the polymerisation conditions, a halogen, an —O—N= group or an —S—C(=S)— group.

The invention provides a composition comprising:
(a) a star polymer comprising:
  (i) a core portion comprising a polyvalent (meth) acrylic monomer, oligomer or polymer thereof or a polyvalent divinyl non-acrylic monomer, oligomer or polymer thereof; and
  (ii) at least two arms of polymerized alkyl (meth)acrylate ester; and
(b) an oil of lubricating viscosity,
wherein the core portion further comprises a functional group of formula (Ib):

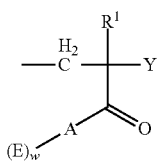

(Ib)

wherein

E is independently another part of the core, a polymeric arm, or a monomeric species, or another structural unit as defined by formula (Ib);

A is nitrogen, oxygen, or a >N—R' group, where R' is hydrogen or a linear or branched alkyl group containing 1 to 5 carbon atoms;

w is 1 when A is oxygen or >N—R', or 2 when A is N;

R[1] is hydrogen, a linear or branched alkyl group containing 1 to 5 carbon atoms; and Y is a free radical leaving group selected from the group consisting of one or more atoms or groups of atoms which may be transferred by a radical mechanism under the polymerisation conditions, a halogen, an —O—N= group or an —S—C(=S)— group.

The invention further provides a composition comprising:
(a) a star polymer obtainable or obtained by a controlled radical polymerisation process, said polymer comprising:
  (i) a core portion of a polyvalent (meth) acrylic monomer, oligomer or polymer thereof or a polyvalent divinyl non-acrylic monomer, oligomer or polymer thereof; and
  (ii) at least two arms of polymerised alkyl (meth)acrylate ester; and
(b) an oil of lubricating viscosity.

The invention further provides a composition comprising:
(a) a star polymer comprising:
  (i) a core portion of a polyvalent (meth) acrylic monomer, oligomer or polymer thereof or a polyvalent divinyl non-acrylic monomer, oligomer or polymer thereof; and
  (ii) at least two arms of polymerised alkyl (meth)acrylate ester; and
(b) an oil of lubricating viscosity,
wherein 98% to 100% of the alkyl groups in the polymerised alkyl (meth)acrylate ester arms contain 1 to 18 carbon atoms; and 0% to 2% of the alkyl groups in the polymerized alkyl (meth)acrylate ester arms contain 19 to 30 carbon atoms.

In one embodiment the invention further provides a composition comprising:
(a) a star polymer comprising:
  (i) a core portion of a polyvalent (meth) acrylic monomer, oligomer or polymer thereof or a polyvalent divinyl non-acrylic monomer, oligomer or polymer thereof; and
  (ii) at least two arms of a polymerised alkyl (meth) acrylate ester; and
(b) an oil of lubricating viscosity, wherein 98% to 100% of the alkyl groups in the polymerised alkyl (meth)acrylate ester arms contain 1 to 15 carbon atoms; and 0% to 2% of the alkyl groups in the polymerized alkyl (meth)acrylate ester arms contain 16 to 30 carbon atoms.

DETAILED DESCRIPTION OF THE INVENTION

In one embodiment the present invention provides a composition comprising:
(a) a star polymer comprising:
  (i) a core portion comprising a polyvalent (meth) acrylic monomer, oligomer or polymer thereof or a polyvalent divinyl non-acrylic monomer, oligomer or polymer thereof; and
  (ii) at least two arms of polymerized alkyl (meth)acrylate ester; and
(b) an oil of lubricating viscosity,
wherein the core portion further comprises a functional group of formula (I):

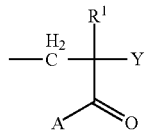

(I)

wherein

R[1] is hydrogen, a linear or branched alkyl group containing 1 to 5 carbon atoms;

A is nitrogen or oxygen; and

Y is a free radical leaving group selected from the group consisting of one or more atoms or groups of atoms which may be transferred by a radical mechanism under the polymerisation conditions, a halogen, an —O—N= group and an —S—C(=S)— group.

In one embodiment the radical leaving group further comprises a carboxy functional group.

As defined herein the —O—N= defines a nitroxide and the =includes a single or double bond from the nitrogen atom. In formula (I) as shown, atoms may have an incomplete valence. However, within the polymer any incomplete valence will be bonded to another part of the core or a polymeric arm or to a monomeric species or another structural unit as defined by formula (I), so as to satisfy the valence of the particular atom. For example the halogen, the —O—N= group or the —S—C(=S)— group may be from compounds defined below. In one embodiment a structural unit defined by formula (I) is present within the core. In one embodiment the a structural unit defined by formula (I) is not present on the polymeric arm.

In one embodiment the present invention provides a composition comprising:
(a) a star polymer obtainable or obtained by a controlled radical polymerisation process, said polymer comprising:
(i) a core portion of a polyvalent (meth) acrylic monomer, oligomer or polymer thereof or a polyvalent divinyl non-acrylic monomer, oligomer or polymer thereof; and
(ii) at least two arms of polymerised alkyl (meth)acrylate ester; and
(b) an oil of lubricating viscosity.

In one embodiment the invention further provides a composition comprising:
(a) a star polymer comprising:
(i) a core portion of a polyvalent (meth) acrylic monomer, oligomer or polymer thereof or a polyvalent divinyl non-acrylic monomer, oligomer or polymer thereof; and
(ii) at least two arms of polymerised alkyl (meth)acrylate ester; and
(b) an oil of lubricating viscosity,
wherein 98% to 100% of the alkyl groups in the polymerised alkyl (meth)acrylate ester arms contain 1 to 18 carbon atoms; and 0% to 2% of the alkyl groups in the polymerized alkyl (meth)acrylate ester arms contain 19 to 30 carbon atoms.

In one embodiment the invention further provides a composition comprising:
(a) a star polymer comprising:
(i) a core portion of a polyvalent (meth) acrylic monomer, oligomer or polymer thereof or a polyvalent divinyl non-acrylic monomer, oligomer or polymer thereof; and
(ii) at least two arms of a polymerised alkyl (meth) acrylate ester; and
(b) an oil of lubricating viscosity,
wherein 98% to 100% of the alkyl groups in the polymerised alkyl (meth)acrylate ester arms contain 1 to 15 carbon atoms; and 0% to 2% of the alkyl groups in the polymerized alkyl (meth)acrylate ester arms contain 16 to 30 carbon atoms.

In one embodiment the polymeric arms of the star polymer have a polydispersity of 2 or less, in another embodiment 1.7 or less, in another embodiment 1.5 or less, for instance, 1 to 1.4.

In one embodiment the star polymer has polydispersity with a bimodal or higher modal distribution. The bimodal or higher distribution is believed to be partially due to the presence of varying amounts of uncoupled polymer chains and/or uncoupled star-polymers or star-to-star coupling formed as the polymer is prepared.

In one embodiment the star polymer has greater than 5 arms, in another embodiment greater than 7 arms, in another embodiment greater than 10 arms, for instance 12 to 100, 14 to 50 or 16 to 40 arms. In one embodiment the star polymer has 120 arms or less, in another embodiment 80 arms or less, in another embodiment 60 arms or less.

In one embodiment the star polymer has a weight average molecular weight $M_w$ of 5000 to 5,000,000, in another embodiment 10,000 to 1,000,000, in another embodiment 10,000 to 600,000 and in another embodiment 15,000 to 500,000. Examples of a suitable $M_w$ include 15,000 to 300,000, 15,000 to 50,000, 150,000 to 280,000 or 25,000 to 140,000.

The star polymer moiety when formed may have uncoupled polymeric arms present (also referred to as a polymer chain or linear polymer). The percentage conversion of a polymer chain to star polymer in one embodiment is at least 10%, in another embodiment at least 20%, in another embodiment at least 40% and in another embodiment at least 55%, for instance 70%, 75% or 80%. In one embodiment the conversion of polymer chain to star polymer is about 90%, 95% or 100%. In one embodiment a portion of the polymer chains does not form a star polymer and remains as a linear polymer. In one embodiment the linear polymer is substantially free of or free of a halogen, an —O—N= group or an —S—C(=S)— group. In one embodiment the linear polymer has a substantially similar or identical composition and weight average molecular weight as the star polymer arms containing a polymerised alkyl (meth)acrylate ester.

In one embodiment the star polymer has a polydispersity greater than 1.5 or 2, in one embodiment 3 or more, in another embodiment 4 or more and in another embodiment 5 or more. An upper range on the polydispersity may include 30 or 20 or 15 or 10. Examples of suitable ranges include 2 to 30, 3 to 15 or 3 to 10. In one embodiment the star polymer comprises a mixture of star and linear polymers. The polydispersity of said mixtures is similar or identical to the ranges described immediately above.

The linear polymer in one embodiment has a weight average molecular weight $M_w$ of 1000 to 500,000, in another embodiment 5,000 to 300,000 and in another embodiment 10,000 to 100,000. In one embodiment the $M_w$ ranges from 10,000 to 20,000.

In one embodiment the star polymer is free of an alkali metal or silicon and is not prepared by anionic polymerization methods or by group-transfer polymerization methods.

In one embodiment one or more of the arms of the star-polymer are di-block AB type copolymers, in another embodiment tri-block ABA type copolymers, in another embodiment tapered block polymers, in another embodiment alternating block polymers.

The star polymer described above in one embodiment is a block-arm star (co)polymer, in another embodiment a hetero-arm star (co)polymer (as described below) and in another embodiment the star polymer is a tapered arm copolymer. A tapered arm copolymer has a variable composition across the length of a polymer chain. For example, the tapered arm copolymer will be composed of, at one end, a relatively pure first monomer and, at the other end, a relatively pure second monomer. The middle of the polymer arm is more of a gradient composition of the two monomers. Tapered block copolymers may be coupled to form block-arm star polymers.

The block-arm star (co)polymer contains one or more polymer arms derived from two or more monomers within the same arm. A more detailed description of the block-arm star polymer is given in Chapter 13 (pp. 333-368) of "Anionic Polymerization, Principles and Practical Applications" by Henry Hsieh and Roderic Quirk (Marcel Dekker, Inc, New York, 1996) (hereinafter referred to as Hsieh et al.).

The hetero-arm, or "mikto-arm," star polymer contains arms which may vary from one another either in molecular weight, composition, or both, as defined in Hsieh et al. For example, a portion of the arms of a given star polymer can be of one polymeric type and a portion of a second polymeric type. More complex hetero-arm star polymers may be formed by combining portions of three or more polymeric arms with a coupling agent.

The star polymers obtainable or obtained by a controlled radical polymerisation process include those made by an atom transfer radical polymerisation (ATRP) process, a reversible addition-fragmentation chain transfer (RAFT) process or a nitroxide-mediated polymerisation process.

Detailed descriptions of nitroxide-mediated polymerisation (Chapter 10, pages 463 to 522), ATRP (Chapter 11, pages 523 to 628) and RAFT (Chapter 12, pages 629 to 690) are given in the "Handbook of Radical Polymerization", Edited by Krzysztof Matyjaszewski and Thomas P. Davis, Copyright 2002 and published by John Wiley and Sons Inc (hereinafter referred to as "Matyjaszewski et al.").

The discussion of the polymer mechanism of RAFT polymerisation is shown on page 664 to 665 in section 12.4.4 of Matyjaszewski et al.

The discussion of the polymer mechanism of ATRP polymerisation is shown on page 524 in reaction scheme 11.1, page 566 reaction scheme 11.4, reaction scheme 11.7 on page 571, reaction scheme 11.8 on page 572 and reaction scheme 11.9 on page 575 of Matyjaszewski et al.

(Meth)Acrylate Ester Polymeric Arms

The expression "(meth)acrylate ester" includes methacrylate esters and acrylate esters as well as mixtures thereof.

The alkyl (meth)acrylate ester in one embodiment contains up to 40 carbon atoms in the alkyl group, in another embodiment up to 30 carbon atoms, in another embodiment 1 to 18 carbon atoms, in another embodiment 1 to 15 carbon atoms and in another embodiment 10 to 15 or 12 to 15 carbon atoms.

In one embodiment the (meth)acrylate ester contains 98% to 100% of the alkyl groups in the polymerised alkyl (meth)acrylate ester arms which contain 1 to 18 carbon atoms; and 0% to 2% of alkyl groups in the polymerized alkyl (meth)acrylate ester arms which contain 19 to 30 carbon atoms.

In one embodiment the (meth)acrylate ester contains 98% to 100% of the alkyl groups in the polymerised alkyl (meth)acrylate ester arms which contain 1 to 15 carbon atoms; and 0% to 2% of alkyl groups in the polymerized alkyl (meth)acrylate ester arms which contain 16 to 30 carbon atoms.

In one embodiment the polymeric arms comprise:
(a) an alkyl ester group containing 10 to 15 carbon atoms present in at least 50% to 100% of the alkyl groups;
(b) an alkyl ester alkyl group containing 6 to 9 carbon atoms present at 0% to 20%, 30% or 40% of the alkyl groups;
(c) an alkyl ester alkyl group containing 1 to 5 carbon atoms present at 0% to 18% or 20% or 30% of the alkyl groups;
(d) an alkyl ester group containing 16 to 30 (or 16 to 18) carbon atoms present at 0% to 2% of the alkyl groups; and
(e) a nitrogen containing monomer present at 0 wt % to 10 wt % of the polymeric arms.

In one embodiment the polymeric arms comprise:
(a) an alkyl ester group containing 10 to 18 carbon atoms present in at least 50% to 100% of the alkyl groups;
(b) an alkyl ester alkyl group containing 6 to 9 carbon atoms present at 0% to 20%, 30% or 40% of the alkyl groups;
(c) an alkyl ester alkyl group containing 1 to 5 carbon atoms present at 0% to 18% or 20% or 30% of the alkyl groups;
(d) an alkyl ester group containing 19 to 30 carbon atoms present at 0% to 2% of the alkyl groups; and
(e) a nitrogen containing monomer present at 0 wt % to 10 wt % of the polymeric arms.

In embodiment the star-polymer is obtained/obtainable by non-anionic polymerisation techniques. In one embodiment the star polymer is obtained/obtainable by non-Group Transfer Polymerisation (GTP) techniques.

In one embodiment the polymeric arms of the (meth) acrylate ester are polymethacrylate arms. In one embodiment the (meth)acrylate ester arm are free of styrene or acrylate monomer units.

The amount of the ester alkyl group containing 10 to 15 carbon atoms present on the star polymer in one embodiment is at least 50% of the alkyl groups, in another embodiment at least 60% of the alkyl groups, in another embodiment at least 70% of the alkyl groups and in another embodiment at least 80% of the alkyl groups. In one embodiment the amount of the ester alkyl group containing 10 to 15 carbon atoms is at least 95% or 98%.

The amount of an ester alkyl group containing 6 to 9 carbon atoms present on the star polymer in one embodiment is from 0% to 15% or 20% or 30% of the alkyl groups, in another embodiment 0% to 10% of the alkyl groups and in another embodiment 0% to 5% of the alkyl groups.

The amount of an ester alkyl group containing 1 to 5 carbon atoms present on the star polymer in one embodiment is from 0% to 13% or 20% or 30% of the alkyl groups, in another embodiment 0% to 8% of the alkyl groups and in another embodiment 0% to 3% of the alkyl groups.

The amount of an ester alkyl group containing 16 to 30 carbon atoms present on the star polymer in one embodiment is from 0% to 1% of the alkyl groups and in another embodiment 0% of the alkyl groups.

Examples of the alkyl portion of a (meth)acrylate ester include those derived from saturated alcohols, such as methyl methacrylate, butyl methacrylate, 2-ethylhexyl (meth)acrylate, octyl(meth)acrylate, nonyl(meth)acrylate, isooctyl(meth)acrylate, isononyl(meth)acrylate, 2-tert-butylheptyl(meth)acrylate, 3-isopropylheptyl(meth)acrylate, decyl(meth)acrylate, undecyl(meth)acrylate, 5-methylundecyl(meth)acrylate, dodecyl(meth)acrylate, 2-methyldodecyl (meth)acrylate, tridecyl(meth)acrylate, 5-methyltridecyl (meth)acrylate, tetradecyl(meth)acrylate, pentadecyl(meth)- acrylate, hexadecyl(meth)acrylate, 2-methylhexadecyl (meth)acrylate, heptadecyl(meth)acrylate, 5-isopropylheptadecyl(meth)acrylate, 4-tert-butyloctadecyl (meth)acrylate, 5-ethyloctadecyl(meth)acrylate, 3-isopropyloctadecyl-(meth)acrylate, octadecyl(meth)acrylate, nonadecyl(meth)acrylate, eicosyl-(meth)acrylate, cetyleicosyl (meth)acrylate, stearyleicosyl(meth)acrylate, docosyl(meth) acrylate and/or eicosyltetratriacontyl(meth)acrylate; (meth)- acrylates derived from unsaturated alcohols, such as oleyl (meth)acrylate; and cycloalkyl(meth)acrylates, such as 3-vinyl-2-butylcyclohexyl(meth)acrylate or bornyl(meth) acrylate.

The ester compounds with long-chain alcohol-derived groups may be obtained, for example, by reaction of a (meth)acrylic acid (by direct esterification) or methylmethacrylate (by transesterification) with long-chain fatty alcohols, in which reaction a mixture of esters such as (meth) acrylate with alcohol groups of various chain lengths is generally obtained. These fatty alcohols include Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea (now Sasol); Epal® 610 and Epal® 810 of Ethyl Corporation; Linevol® 79, Linevol® 911 and Dobanol® 25 L of Shell AG; Liar) 125 of Condea Augusta, Milan; Dehydad® and Lorol® of Henkel KGaA (now Cognis) as well as Linopol® 7-11 and Acropol® 91 of Ugine Kuhlmann.

In one embodiment the star polymer is further functionalised in the core or the polymeric arms with a nitrogen containing monomer. The nitrogen containing monomer includes a vinyl substituted nitrogen heterocyclic monomer, a dialkylaminoalkyl (meth)acrylate monomer, a dialkylaminoalkyl (meth)-acrylamide monomer, a tertiary-(meth)acrylamide monomer or mixtures thereof.

In one embodiment the core or polymeric arms further comprise a (meth)acrylamide or (meth)acrylate monomer of formula (IIa) or (IIb) respectively:

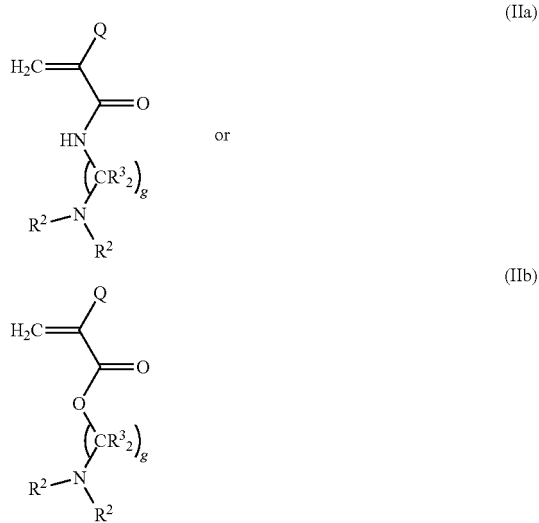

wherein
Q is hydrogen or methyl and, in one embodiment, Q is methyl;
each $R^2$ is independently hydrogen or hydrocarbyl group containing 1 to 8 or 1 to 4 carbon atoms;
each $R^3$ is independently hydrogen or hydrocarbyl group containing 1 to 2 carbon atoms and, in one embodiment, each $R^3$ is hydrogen; and
g is an integer from 1 to 6 and, in one embodiment, g is 1 to 3.

Examples of a suitable nitrogen containing monomer include vinyl pyridine, N-vinyl imidazole, N-vinyl pyrrolidinone, and N-vinyl caprolactam, dimethylaminoethyl acrylate, dimethylamino ethyl methacrylate, dimethyl-aminobutylacrylamide, dimethylamine propyl methacrylate, dimethylamino-propylacrylamide, dimethylaminopropylmethacrylamide, dimethylaminoethyl-acrylamide or mixtures thereof.

Functionalised Star Polymer

In one embodiment of the invention the polymeric arms or core are functionalised by copolymerization or grafting onto or into the arms or core with an acylating agent, an amine or mixtures thereof.

Examples of a grafting acylating agent include an unsaturated carboxylic acid or anhydride or derivatives thereof such as maleic anhydride, (meth) acrylic acid or itaconic acid. As used herein, the expression "(meth)acrylic" signifies acrylic or methacrylic, and similarly "(meth)acrylate" signifies acrylate or methacrylate.

In one embodiment the acylating agent is a dicarboxylic acid or anhydride. Examples of a dicarboxylic acid or anhydride thereof include itaconic anhydride, maleic anhydride, methyl maleic anhydride, ethyl maleic anhydride, dimethyl maleic anhydride or mixtures thereof.

In one embodiment the polymer is further reacted with an amine to form a dispersant. Examples of an amine include an amino hydrocarbyl substituted amine, such as 4-aminodiphenylamine, a hydrocarbyl substituted morpholine, such as 4-(3-aminopropyl) morpholine or 4-(2-aminoethyl) morpholine or a dialkyl amino alkyl (meth)acrylate such as a dimethyl amino alkyl (meth)acrylate or N-vinyl pyrrolidinone. In one embodiment the alkyl group of dimethyl amino alkyl (meth)acrylate is propyl and in another embodiment ethyl.

In one embodiment the polymer is further copolymerisation or grafting onto or into the arms or core with an acylating agent and an amine to form a dispersant viscosity modifier (often referred to as a DVM), thus named because such materials exhibit both dispersant and viscosity modifying properties.

Core Portion

The core portion of a polyvalent (meth) acrylic monomer, oligomer or polymer thereof or a polyvalent divinyl non-acrylic monomer oligomer or polymer thereof is a moiety chemically bonded to the polymeric arms. The polyvalent monomer, oligomer or polymer thereof may be used alone or as a mixture.

In one embodiment the polyvalent divinyl non-acrylic monomer is a divinyl benzene. In one embodiment the polyvalent (meth) acrylic monomer is an acrylate or methacrylate ester of a polyol or a methacrylamide of a polyamine, such as an amide of a polyamine, for instance a methacrylamide or an acrylamide. In one embodiment the polyvalent (meth) acrylic monomer is an acrylic or methacrylic acid polyol or a condensation product of a polyamine.

The polyol in one embodiment contains 2 to 20 carbon atoms, in another embodiment 3 to 15 carbon atoms and in another embodiment 4 to 12 carbon atoms; and the number of hydroxyl groups present in one embodiment is 2 to 10, in another embodiment 2 to 4 and in another embodiment 2. Examples of polyols include ethylene glycol, poly (ethylene glycols), alkane diols such as 1,6 hexanene diol or triols such as trimethylolpropane, oligomerized trimethylolpropanes such as Boltorn® materials sold by Perstorp Polyols. Examples of a polyamine include polyalkylenepolyamines, such as, ethylenediamine, diethylenetriamine, triethylenetetramine, tetraethylene pentamine, pentaethylenehexamine and mixtures thereof.

Examples of the polyvalent unsaturated (meth) acrylic monomer include ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, pentaerythritol tetraacrylate, 1,3-propanediol diacrylate, 1,5-pentanediol dimethacrylate, bis-acrylates and methacrylates of polyethylene glycols of molecular weight 200-4000, polycaprolactonediol diacrylate, pentaerythritol triacrylate, 1,1,1-trimethylolpropane triacrylate, pentaerythritol diacrylate, pentaerythritol triacrylate, pentaerythritol tetraacrylate, triethylene glycol diacrylate, triethylene glycol dimethacrylate, 1,1,1-trimethylolpropane trimethacrylate, hexamethylenediol diacrylate or hexamethylenediol dimethacrylate or an alkylene bis-(meth) acrylamide.

The amount of polyvalent coupling agent may be an amount suitable to provide coupling of polymer previously prepared as arms onto a core comprising the coupling agent in monomeric, oligomeric, or polymeric form, to provide a star polymer. As described above, suitable amounts may be determined readily by the person skilled in the art with minimal experimentation, even though several variable may be involved. For example, if an excessive amount of coupling agent is employed, or if excessive unreacted monomer from the formation of the polymeric arms remains in the system, crosslinking rather than star formation may occur. Typically the mole ratio of polymer arms to coupling agent may be 50:1 to 1.5:1 (or 1:1), or 30:1 to 2:1, or 10:1 to 3:1, or 7:1 to 4:1, or 4:1 to 1:1. In other embodiments the mole ratio of polymer arms to coupling agent may be 50:1 to 0.5:1, or 30:1 to 1:1, or 7:1 to 2:1. The desired ratio may also be adjusted to take into account the length of the arms, longer arms sometimes tolerating or requiring more coupling agent than shorter arms. Typically the material prepared is soluble in an oil of lubricating viscosity.

ATRP Polymerisation

In one embodiment the core portion comprises a functional group of formula (I) as shown above, wherein Y is a halogen, such as bromine, chlorine, fluorine or iodine. When Y is a halogen, the star polymer is often prepared by ATRP techniques discussed above.

When Y is a halogen in formula (I) above, it may be derived from a suitable halogen-containing compound such as an initiator including those that contain one or more atoms or groups of atoms which may be transferred by a radical mechanism under the polymerisation conditions. More detail on ATRP processes is given in U.S. Pat. No. 6,391,996. Suitable atoms or groups of atoms which may be transferred by a radical mechanism, including classes of halogen compound include formulae (III)-(X):

(III)

(IV)

(V)

(VI)

(VII)

(VIII)

(IX)

(X)

wherein
n is 0, 1 or 2;
m is 0 to 1;
X is Cl, Br, I, OR$^4$, SR$^8$, SeR$^5$, OC(=O)R$^8$, OP(=O)R$^8$, OP(=O)(OR)$_2$, OP(=O)OR$^8$, O—N(R$^8$)$_2$, S—C(=S)N(R$^8$)$_2$, CN, NC, SCN, CNS, OCN, CNO or N$_3$;

R$^4$ is an alkyl group with 1 to 20 carbon atoms and containing at least one halogen, in which each hydrogen atom in said alkyl group independently may be replaced by a halide, such as fluoride or chloride; an alkenyl group with 2 to 20 carbon atoms and containing at least one halogen, such as a vinyl or alkynyl group with 2 to 10 carbon atoms, such as an acetyelnyl, phenyl, which may be substituted with 1 to 10 halogen atoms or alkyl groups with 1 to 4 carbon atoms, or aralkyl(aryl-substituted alkyl and containing at least one halogen, in which the aryl group is phenyl or substituted phenyl and the alkyl group represents an alkyl with 1 to 6 carbon atoms including benzyl;

R$^8$ includes an aryl group or a straight-chain or branched alkyl group with 1 to 20 carbon atoms and containing at least one halogen, and in another embodiment 1 to 9 carbon atoms, or R$^8$ is a ring, for instance, a heterocyclic ring with 5, 6 or 7 members and containing at least one halogen functional group; and R$^5$, R$^6$ and R$^7$ are independently hydrogen, halogens or hydrocarbyl groups, for instance, an alkyl group with 1 to 20 carbon atoms or 1 to 10 carbon atoms or 1 to 6 carbon atoms or a cycloalkyl group with 3 to 8 carbon atoms. R$^5$, R$^6$ and R$^7$ may further include an optionally substituted allyl group or vinyl, oxiranyl, glycidyl, alkylene or alkenylene groups with 2 to 6 carbon atoms, wherein the optionally substituted group may include oxiranyl or glycidyl, aryl, heterocyclyl, aralkyl or aralkenyl(aryl-substituted alkenyl.

Examples of a halogen containing compound defined by formulae (III)-(X) include benzyl halides, such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane; carboxylic acid derivatives which are halogenated at the α-position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides such as tetrachloromethane, tribromomethane, 1-vinylethyl chloride, 1-vinylethyl bromide; and halogen derivatives of phosphoric acid esters, such as dimethylphosphoric acid.

In one embodiment when the halogen compound is employed, a transition metal such as copper is also present. The transition metal may be in the form of a salt. The transition metal is capable of forming a metal to ligand bond and the ratio of ligand to metal depends on the dentate number of the ligand and the co-ordination number of the metal. The ligand is a nitrogen or phosphorus containing ligand.

Examples of a suitable ligand include triphenylphosphane, 2,2-bipyridine, alkyl-2,2-bipyridine, such as 4,4-di-(5-nonyl)-2,2-bipyridine, 4,4-di-(5-heptyl)-2,2-bipyridine, tris(2-aminoethyl)amine (TREN), N,N,N',N',N"-pentamethyldiethylenetriamine, 1,1,4,7,10,10-hexamethyltriethylenetetramine and/or tetramethylethylenediamine. Further suitable ligands are described in, for example, International Patent application WO 97/47661. The ligands may be used individually or as a mixture. In one embodiment the nitrogen containing ligand is employed in the presence of copper.

In one embodiment the ligand is phosphorus containing with triphenyl phosphene (PPh$_3$) a common ligand. A suitable transition metal for a triphenyl phosphene ligand includes Rh, Ru, Fe, Re, Ni or Pd.

RAFT Polymerisation

In one embodiment the core portion comprises a functional group of formula (I), wherein Y is —S—C(=S)—. When Y is —S—C(=S)—, the star polymer is often prepared by RAFT techniques discussed above in Matyjaszewski et al. The —S—C(=S)— functional group is often derived from or is a portion of a chain transfer agent.

In one embodiment the core portion comprises a functional group (often from a chain transfer agent) derived from a compound comprising: a thiocarbonyl thio group and a free radical leaving group represented by formulae (XIa) to (XIg):

| CTA | Y |
|---|---|

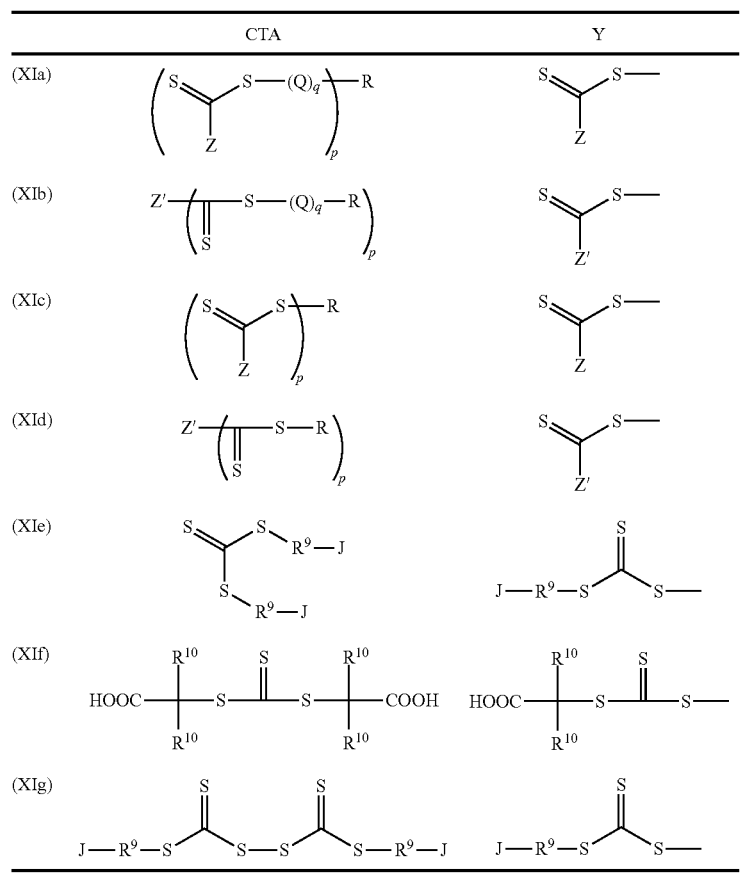

wherein

Z is independently hydrogen, a halogen such as chlorine, bromine or iodine, a hydrocarbyl group or a group containing a heteroatom bonded directly to the carbon of the thiocarbonyl group and containing a heteroatom including oxygen, nitrogen, phosphorus or sulphur;

Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;

Q is a conjugating group;

q is an integer from 0 to 10, 0 to 5, 0 to 3 or 0 to 2 or 0, 1 to 10, 1 to 5, 1 to 3 or 1 to 2;

p is an integer from 1 to 200, 1 to 100, 1 to 50 or 1 to 10;

J is independently a group including cyano, halogen, carboxylic acid, carboxylic ester, and carboxylic amide or imide;

R is a free radical leaving group capable of initiating free radical polymerisation;

$R^9$ is independently a hydrocarbyl group that is optional substituted with a functional group defined by $R^{10}$; and $R^{10}$ is independently a cyano group, a halogen, such as, chlorine, fluorine, iodine or bromine, or hydrocarbyl group such as a linear or branched alkyl group or an aryl group containing 1 to 50, 1 to 20, 1 to 10 or 1 to 6 carbon atoms.

The chain transfer agent may have a transfer constant from 0.05 to 10,000 or 0.1 to 5000.

Trithiocarbonates (—S—C(=S)—S—) are preferably used, for example structures XIe, XIf, and XIg, or where Z is a sulphur-containing compound in structures XIa and XIc, or Z' is a sulphur-containing compound in structures XIb and XId. The free radical leaving groups, R or $R^9$, should stabilize a free radical. Tertiary carbon groups, such as geminal dimethyl substitution of an alkyl group is further preferred. The alkyl group may contain further substitution with carboxy groups such as carboxylic acid, ester, or amide functionalities.

In one embodiment the group further comprises a —S—C(=S)— group with a geminal dimethyl group directly attached to the sulphur.

Examples of a suitable RAFT chain transfer agent include benzyl 1-(2-pyrrolidinone)carbodithioate, benzyl (1,2-benzenedicarboximido)carbodithioate, 2-cyanoprop-2-yl 1-pyrrolecarbodithioate, 2-cyanobut-2-yl 1-pyrrolecarbodithioate, benzyl 1-imidazolecarbodithioate, N,N-dimethyl-S-(2-cyanoprop-2-yl)dithiocarbamate, N,N-diethyl-S-benzyl dithiocarbamate, cyanomethyl 1-(2-pyrrolidone)carbodithoate, cumyl dithiobenzoate, N,N-diethyl S-(2-ethoxycarbonylprop-2-yl)dithiocarbamate, O-ethyl-S-(1-phenylethyl)xanthtate, O-ethyl-S-(2-(ethoxycarbonyl)prop-2-yl) xanthate, O-ethyl-S-(2-cyanoprop-2-yl)xanthate, O-ethyl-S-(2-cyanoprop-2-yl)xanthate, O-ethyl-S-cyanomethyl xanthate, O-phenyl-S-benzyl xanthate, O-pentafluorophenyl-S-benzyl xanthate, 3-benzylthio-5,5-dimethylcyclohex-2-ene-1-thione or benzyl 3,3-di(benzylthio)-prop-2-enedithioate, S,S'-bis-(α,α'-disubstituted-α"-acetic acid)-trithiocarbonate, S,S'-bis-(α,α'-disubstituted-α"-acetic acid)-trithiocarbonate or S-alkyl-S'-(-(α,α'-disubstituted-α"-acetic acid)-trithiocarbonates, dithiobenzoic acid, 4-chlorodithiobenzoic acid, benzyl dithiobenzoate, 1-phenylethyl dithiobenzoate, 2-phenylprop-2-yl dithiobenzoate, 1-acetoxyethyl dithiobenzoate, hexakis(thiobenzoylthiomethyl)benzene, 1,4-bis(thiobenzoylthiomethyl)benzene, 1,2, 4,5-tetrakis(thiobenzoylthiomethyl)benzene, 1,4-bis-(2-(thiobenzoylthio)-prop-2-yl)benzene, 1-(4-methoxyphenyl) ethyl dithiobenzoate, benzyl dithioacetate, ethoxycarbonylmethyl dithioacetate, 2-(ethoxycarbonyl) prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphosphinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group or mixtures thereof.

Nitroxide-Mediated Polymerisation

In one embodiment the core portion comprises a functional group of formula (I), wherein Y is a —O—N= group. When Y is a —O—N= group, the star polymer is often prepared by nitroxide mediated techniques discussed above.

When nitroxide-mediated techniques are employed, in some instances a portion of styrene may be desirable (for instance, the amount of (meth)acrylate is less than 50 wt % of the star polymer) to allow for a satisfactory polymer to be prepared using TEMPO based derivatives for the reasons stated in Matyjaszewski et al., page 477, section 10.4.

Alternatively, if non-TEMPO based nitroxide mediated techniques are employed using an alicyclic nitroxide or nonquaternary nitroxide, the presence of styrene is not essential. A list of compounds suitable for nitroxide-mediated techniques is given in Table 10.1, pages 479-481 of Matyjaszewski et al.

The amount of the compound employed to impart halogen, —O—N= group or an —S—C(=S)— functionality into the core portion in one embodiment is 0.001 to 0.10 moles per mole of monomer, in another embodiment 0.001 to 0.05 moles per mole of monomer and in yet another embodiment 0.001 to 0.03 moles per mole of monomer in the arms. Examples of the amount of the compound employed to impart halogen, —O—N= group or an —S—C(=S)— functionality being present include 0.002 to 0.006, 0.003 to 0.008 or 0.003 to 0.005 moles per mole of monomer.

Oil of Lubricating Viscosity

The lubricating oil composition includes natural or synthetic oils of lubricating viscosity, oil derived from hydrocracking, hydrogenation, hydrofinishing, and unrefined, refined and re-refined oils and mixtures thereof.

Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils. In one embodiment the polymer composition of the present invention is useful when employed in a gas-to-liquid oil. Often Fischer-Tropsch hydrocarbons or waxes may be hydroisomerised.

Oils of lubricating viscosity may also be defined as specified in the American Petroleum Institute (API) Base Oil Interchangeability Guidelines. In one embodiment the oil of lubricating viscosity comprises an API Group I, II, III, IV, V, VI or mixtures thereof, and in another embodiment API Group I, II, III or mixtures thereof. If the oil of lubricating viscosity is an API Group II, III, IV, V or VI oil there may be up to 40 wt %, and in another embodiment up to a maximum of 5 wt % of the lubricating oil an API Group I oil present. In one embodiment the oil of lubricating viscosity is present in a concentrate forming amount.

The oil of lubricating viscosity in one embodiment is present from 15 wt % to 99.9 wt % of the composition, in another embodiment from 30 wt % to 98.9 wt % of the composition, in another embodiment from 40 wt % to 97.9 wt % of the composition, in another embodiment and in another embodiment from 50 wt % to 94.5 wt % of the composition.

Other Performance Additive

The composition of the invention optionally further includes at least one other performance additive. The other performance additives include metal deactivators, detergents, dispersants, viscosity index improvers (that is, viscosity modifiers other than the star polymer of the invention), extreme pressure agents, antiwear agents, antioxidants, corrosion inhibitors, foam inhibitors, demulsifiers, pour point depressants, seal swelling agents and mixtures thereof.

The total combined amount of the other performance additive compounds present on an oil free basis ranges from 0 wt % to 25 wt %, in one embodiment 0.01 wt % to 20 wt %, in another embodiment 0.1 wt % to 15 wt % and in yet another embodiment 0.5 wt % to 10 wt % or 1 to 5 wt % of the composition. Although one or more of the other performance additives may be present, it is common for the other performance additives to be present in different amounts relative to each other.

If the present invention is in the form of a concentrate (which can be combined with additional oil to form, in whole or in part, a finished lubricant), the ratio of the star-polymer of the invention and other optional performance additives in an oil of lubricating viscosity, to diluent oil may be in the range of 80:20 to 10:90 by weight.

Antioxidants include molybdenum dithiocarbamates, sulphurised olefins, hindered phenols, diphenylamines; detergents include neutral or overbased, Newtonian or non-Newtonian, basic salts of alkali, alkaline earth or transition metals with one or more of a phenate, a sulphurised phenate, a sulphonate, a carboxylic acid, a phosphorus acid, a mono-and/or a di-thiophosphoric acid, a saligenin, an alkylsalicylate, and a salixarate; and dispersants include N-substituted long chain alkenyl succinimides as Mannich condensation products as well as post-treated versions thereof. Post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates; phosphoric acid esters or salt thereof; phosphites; and phosphorus-containing carboxylic esters, ethers, and amides; antiscuffing agents including organic sulphides and polysulphides, such as benzyldisulphide, bis-(chlorobenzyl) disulphide, dibutyl tetrasulphide, di-tertiary butyl polysulphide, di-tert-butylsulphide, sulphurised Diels-Alder adducts or alkyl sulphenyl N'N-dialkyl dithiocarbamates; and extreme pressure (EP) agents including chlorinated wax, organic sulphides and polysulphides, such as benzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons, metal thiocarbamates, such as zinc dioctyldithiocarbamate and barium heptylphenol diacid may also be used in the composition of the invention.

Additionally the invention may also include friction modifiers including fatty amines, esters such as borated glycerol esters, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylenepolyamines, amine salts of alkylphosphoric acids; and viscosity modifiers other than the star polymer of the invention, including hydrogenated copolymers of styrene-butadiene rubbers, ethylene-propylene copolymers, polyisobutenes, hydrogenated styrene-isoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers. Generally conventional poly(meth)acrylate viscosity modifiers other than the star polymer of the invention are linear or star-polymers derived from anionic polymerisation as described in WO96/23012 and EP 936 225. Conventional poly(meth)acrylate polymers may be derived from monomers substantially the same as those defined for the polymeric arms. However, the conventional poly(meth)acrylate is generally free of a functional group selected from a halogen, an —O—N= group and an —S—C(=S)— group, for instance a functional group Y as defined in formula (I). In one embodiment the polymer of the invention is mixed with a conventional viscosity modifier.

Other performance additives such as corrosion inhibitors including octylamine octanoate, condensation products of dodecenyl succinic acid or anhydride and a fatty acid such as oleic acid with a polyamine; metal deactivators including derivatives of benzotriazoles, 1,2,4-triazoles, benzimidazoles, 2-alkyldithiobenzimidazoles or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and seal swell agents including Exxon Necton-37™ (FN 1380) and Exxon Mineral Seal Oil (FN 3200); and dispersant viscosity modifiers (often referred to as DVM) include functionalised polyolefins, for example, ethylene-propylene copolymers that have been functionalized with the reaction product of maleic anhydride and an amine, a polymethacrylate functionalised with an amine, or styrene-maleic anhydride copolymers reacted with an amine; may also be used in the composition of the invention.

Process for Preparing Star Polymer

The polymerisation process may be carried out as a batch process, a semi-batch process, a continuous process, a feed process or a bulk process. The process may be in an emulsion, solution or suspension.

As to the synthesis of any of the polymers described herein, the Y group in the above formulae may optionally be removed subsequent to the formation of the star polymer by process known in the art. Examples of suitable methods to remove the Y group include but are not limited to contact with radical sources, (e.g. peroxide compounds), or application of elevated temperature.

The invention further provides a process for preparing a nitroxide-mediated star-polymer comprising the steps of:
(1) contacting:
    (i) a free radical initiator;
    (ii) a radically polymerisable monomer; and
    (iii) free radical mediator, to form a polymer chain;
(2) contacting the polymer chain of step (1) with a polyvalent coupling agent to form a star-polymer;
and at least one of steps (3) to (4);
(3) contacting the polymer prepared by step (1) or step (2), and any other processing steps with a polymerisation inhibitor;
(4) mixing the polymer prepared by step (1) or step (2) or step (3), and any other processing steps with an oil of lubricating viscosity to form a lubricating composition.

The invention further provides a process for preparing a ATRP star-polymer comprising the steps of:
(1) contacting:
    i. a radically polymerisable monomer;
    ii. a transition metal catalyst;
    iii. a nitrogen or phosphorus containing ligand;
    iv. a halogen initiator, to form a polymer chain; and
    v. optionally a free radical mediator, to form a polymer chain;
(2) contacting the polymer chain of step (1) with a polyvalent coupling agent to form a star-polymer;
and at least one of steps (3) to (4);
(3) contacting the polymer prepared by step (1) or step (2), and any other processing steps with a polymerisation inhibitor;
(4) mixing the polymer prepared by step (1) or step (2) or step (3), and any other processing steps with an oil of lubricating viscosity to form a lubricating composition.

The process of step (1) and/or (2) for preparing a nitroxide-mediated star-polymer and/or a ATRP star-polymer is carried out at a temperature in one embodiment in the range of 15° C. to 200° C., in another embodiment 35° C. to 180° C., in another embodiment 60° C. to 150° C. and in another embodiment 80° C. to 130° C. The process of step (3) may be carried out at a temperature in one embodiment from 60° C. to 260° C., in another embodiment 100° C. to 225° C. and in another embodiment 130° C. to 190° C. The process of step (4) is carried out at a temperature in one embodiment in the range of 15° C. to 200° C., in another embodiment 15° C. to 180° C., in another embodiment 20° C. to 150° C. and in another embodiment 20° C. to 130° C.

RAFT polymers may be prepared by the process described in the co-pending patent application by Schober et al. filed on the same day herewith.

In one embodiment of the invention the process comprises adding a polymerisation inhibitor. The inhibitor slows or stops further radical reactions. This is useful for limiting the amount of star-to-star coupling or other reactions that may occur after the desired material is prepared. Examples of a polymerisation inhibitor include an oil of lubricating viscosity with a sulphur content above 3000 ppm, hydroquinone monomethyl ether or derivatives thereof. Other types of polymerisation inhibitors which may be used include diaryl amines, sulphurised olefins, or hindered phenols.

The invention further provides a star-polymer obtained (or obtainable) by the process described above.

Optional Medium for Polymerisation

The invention optionally includes a medium for polymerisation. Alternatively the polymerisation may be carried out in the substantial absence of the medium.

As used herein the term "substantial absence" means that the medium for polymerisation is present in one embodiment at less than 5 wt % of the amount of monomer present, in another embodiment less than 2 wt % of the amount of monomer present, in another embodiment less than 0.5 wt % of the amount of monomer present neat an in yet another embodiment at 0 wt % of the amount of monomer present.

The medium for polymerisation is one in which the reactants are soluble, often a substantially inert normally liquid organic diluent. Examples include an oil of lubricating viscosity or an alkyl aromatic compound such as toluene, xylene and naphthalene. Solvents which readily transfer hydrogen atoms under radical conditions are preferably avoided. In several embodiments the medium for polymerisation has a sulphur content ranging from 0 ppm to 3000 ppm, or 1 ppm to 2000 ppm or 10 ppm to 1000 ppm.

Optional Promoter

The invention optionally includes a promoter to facilitate the polymerisation. In one embodiment the promoter is present and in another embodiment is absent. The optional promoter is particularly suitable for nitroxide mediated polymerisation.

The promoter may include a catalytic amount of a strong acid or an amine salt of an acid in an amount suitable to enhance the rate of polymerization. The promoter is often an acid with a pKa as measured in water of less than 4, in another embodiment less than 2.5, and in another embodiment less than 2. Examples of compounds suitable as a promoter include phosphonic acids, phosphoric acids, mineral acids, sulphonic acids, acidic clays, organic sulphonic acids, carboxylic acids, acidic salts of any of these acids, and monoesters of sulphurous- and/or sulphuric acids. Examples of known organic sulphonic acids include camphorsulphonic acid, toluene sulphonic acid 2-fluoro-1-methylpyridinium p-toluenesulphonate, trifluoromethanesulphonic acid, 3,5-di-t-butyl-4-hydroxybenzenesulphonic acid or pyridinium p-toluenesulphonate and mixtures thereof.

INDUSTRIAL APPLICATION

The invention is useful for a variety of applications for the production of star polymers by the process described above. The composition described above may be used, for instance, in a transmission fluid, a gear oil, a hydraulic fluid or an internal combustion engine lubricant to impart at least one property comprising low temperature viscometrics, high temperature viscometrics, shear stability, dispersancy, viscosity index improving or mixture thereof, for instance as a dispersant viscosity modifier.

In one embodiment the lubricating composition is a gear oil and in another embodiment an automatic transmission fluid and in another embodiment an internal combustion engine fluid for crankcase lubrication.

The star polymer is present in one embodiment from 0.1 wt % to 60 wt % of the composition, in another embodiment from 1 wt % to 50 wt % of the composition, in another embodiment from 2 wt % to 45 wt % of the composition, in another embodiment and in another embodiment from 5 wt % to 40 wt % of the composition.

The following examples provide illustrations of the invention. These examples are non exhaustive and are not intended to limit the scope of the invention.

EXAMPLES

Examples 1-14 Random Star Copolymer of a Polymethacrylate Coupled with DVB

A series of polymethacrylate stars of different overall molecular weight are prepared by varying the amount of initiator and divinyl benzene (DVB) as shown in the Table 3 below. $C_{12-15}$ methacrylate (70% wt), 2-ethylhexyl methacrylate (30% wt), Trigonox™-21 ("T-21") initiator (1 eq), cumyl dithiobenzoate (2 eq) and oil (26% wt) are combined at room temperature in vessel equipped with a nitrogen inlet flowing at 28.3 L/hr, a medium speed mechanical stirrer, a thermocouple and a water-cooled condenser and are stirred under $N_2$ blanket for 20 minutes to ensure mixing. The nitrogen flow is reduced to 14.2 L/hr and the mixture is set to be heated to 90° C. for 4 hrs. DVB is charged to the reaction flask and the mixture is stirred at 90° C. for a maximum of 12 hours. The results obtained for average weight molecular weight (Mw), number average molecular weight (Mn), the polydispersity (PDI) as measured by gel permeation chromatography (GPC), the average number of arms on the star polymer and the percentage conversion to star polymer is based on the amount of polymer arm converted to the star polymer are shown in Table 1:

TABLE 1

| EX | Mn of the arm g/mol | wt % Trigonox 21 | Ratio* | Average No. of arms | %** | Star Polymer Mw (1000's) | Star Polymer Mn (1000's) | PDI |
|---|---|---|---|---|---|---|---|---|
| 1 | 16,000 | 0.7 | 5:1 | 2 | 8 | 48 | 47 | 1.02 |
| 2 | 16,000 | 0.7 | 10:1 | 4 | 49 | 77 | 74 | 1.04 |
| 3 | 16,000 | 0.7 | 17:1 | 7 | 78 | 133 | 104 | 1.28 |
| 4 | 20,000 | 0.5 | 10:1 | 2 | 16 | 61 | 58 | 1.05 |
| 5 | 20,000 | 0.5 | 17:1 | 4 | 57 | 101 | 83 | 1.22 |
| 6 | 20,000 | 0.5 | 25:1 | 12 | 76 | 323 | 220 | 1.47 |
| 7 | 33,000 | 0.5 | 5:1 | 3 | 20 | 87 | 84 | 1.04 |
| 8 | 33,000 | 0.3 | 10:1 | 3 | 38 | 102 | 93 | 1.10 |
| 9 | 33,000 | 0.3 | 17:1 | 5 | 68 | 190 | 160 | 1.19 |
| 10 | 33,000 | 0.3 | 25:1 | 7 | 76 | 286 | 230 | 1.24 |
| 11 | 33,000 | 0.3 | 34:1 | 10 | 79 | 378 | 294 | 1.29 |
| 12 | 54,000 | 0.2 | 17:1 | 3 | 10 | 148 | 143 | 1.03 |
| 13 | 54,000 | 0.2 | 25:1 | 6 | 66 | 378 | 304 | 1.24 |
| 14 | 54,000 | 0.2 | 34:1 | 6 | 63 | 384 | 311 | 1.23 |

Where * is the ratio of DVB:polymer and where ** is the conversion of polymer chain to star polymer.

In one experiment not included in the above table, an oil-insoluble material of apparently very high molecular weight was formed, for reasons that are not clear.

Examples 15-19 Random Star Copolymer of a Polymethacrylate Coupled with HDDMA

The process is similar to examples 1-14 except the monomer composition is varied as shown in Table 2 the coupling agent is 1,6-hexanediol dimethacrylate (HDDMA), and hydroquinone monomethyl ether (HQMME) is added to inhibit further coupling. The HDDMA:polymer ratio for all examples is 7:1. The other results obtained are shown in Table 3:

TABLE 2

| Example | Polymer Composition |
|---|---|
| 15 | 70 wt % C12 to C15 methacrylate; and 30 wt % 2-ethylhexyl methacrylate |
| 16 | 80 wt % C12 to C15 methacrylate; and 20 wt % methyl methacrylate |
| 17 | 90 wt % C12 to C15 methacrylate; and 10 wt % methyl methacrylate |
| 18 | 70 wt % C12 to C15 methacrylate; and 30 wt % 2-ethylhexyl methacrylate |
| 19 | 70 wt % C12 to C15 methacrylate; and 30 wt % 2-ethylhexyl methacrylate |

TABLE 3

| Ex | Mn of the arm g/mol | wt % T-21 | CTA/ T-21 ratio | Average No. of arms | % conversion to star polymer | Mw of the star (1000) | Mn of the star (×1000) | PDI |
|---|---|---|---|---|---|---|---|---|
| 15 | 15300 | 2.3 | 2/1 | 13 | 80 | 262.4 | 209.5 | 1.25 |
| 16 | 26900 | 0.4 | 2/1 | 8 | 76.5 | 253.3 | 181.3 | 1.4 |
| 17 | 31800 | 0.3 | 2/1 | 4.2 | 47 | 158.2 | 64.1 | 2.47 |
| 18 | 29600 | 0.12 | 5/1 | 11 | 76.8 | 467.6 | 365.6 | 1.28 |
| 19 | 21800 | 0.18 | 5/1 | 13 | 86.9 | 406 | 319 | 1.28 |

Examples 20-25—Narrow Polydispersity Linear Block/Tapered Copolymers by RAFT Polymerisation A series of block copolymers with varying monomer composition of the blocks and different overall molecular weights are prepared by the process similar to examples 1-14 except the monomers are added in two portions, where the second monomer portion also contains an additional small amount (~10 wt % of the initial charge) of the free radical initiator (see Table 4). In examples 20-22, the first portion contains $C_{12-15}$ methacrylate ($C_{12-15}$ MA) and this is allowed to polymerise for 4 hrs before the second monomer is added to allow the formation of block/tapered copolymer. In examples 23-24, the first portion contains a mixture of $C_{12-15}$MA and 2-EHMA (2-ethylhexyl methacrylate), polymerisation of which forms a random first block. Addition of styrene as a second monomer portion leads to the formation of block/tapered copolymer. Example 25 is prepared in similar manner to examples 23-24, except the first portion of monomer is a mixture of $C_{12-15}$MA and methyl methacrylate (MMA).

TABLE 4

| | | GPC | | |
|---|---|---|---|---|
| Example | VM Description | Mn | Mw | PDI |
| 20 | $PC_{12-15}$MA-b-PS (80:20 wt %) | 33600 | 39700 | 1.18 |
| 21 | $PC_{12-15}$MA-b-PMMA (90:10 wt %) | 26200 | 22600 | 1.15 |
| 22 | $PC_{12-15}$MA-b-PEHMA (70:30 wt %) | 32700 | 39000 | 1.19 |
| 23 | $P(C_{12-15}$MA/2-EHMA)-b-PS (63:27:10 wt %) | 30000 | 37100 | 1.23 |
| 24 | $P(C_{12-15}$MA/2-EHMA)-b-PS (56:24:20 wt %) | 27600 | 35200 | 1.27 |
| 25 | $P(C_{12-15}$MA/MMA)-b-PS (64:16:20 wt %) | 46500 | 52500 | 1.13 |

Footnote to Table 4:
-b-denotes block copolymer;
PS is polystyrene;
$PC_{12-15}$MA is poly $C_{12-15}$ alkyl methacrylate;
$P(C_{12-15}$MA/MMA) is copolymer of $C_{12-15}$ alkyl methacrylate and methyl methacrylate;
$C_{12-15}$MA/2-EHMA is is copolymer of $C_{12-15}$ alkyl methacrylate and 2-ethylhexyl methacrylate;
PEHMA is polymer of 2-ethylhexyl methacrylate; and
PMMA is poly methyl methacrylate.

Examples 26-45: Block/Tapered Star Copolymers with HDDMA

The process is similar to examples 15-19 except the monomer composition varied as is shown in Table 5 and the monomers are added in 2 portions as described in examples 20-25. The HDDMA:polymer ratio for all examples is 7:1. The other results obtained are shown in Table 6:

TABLE 5

| Example | Block Copolymer Composition |
|---|---|
| 26 | (C12 to C15 methacrylate)-b-(methyl methacrylate) with wt % ratio of 80:20 |
| 27 | (C12 to C15 methacrylate)-b-(methyl methacrylate) with wt % ratio of 70:30 |
| 28 | (C12 to C15 methacrylate-b-2-ethylhexyl methacrylate)-b-(styrene) with a wt % ratio of 63:27:10 |
| 29 | (C12 to C15 methacrylate-b-2-ethylhexyl methacrylate)-b-(styrene) with a wt % ratio of 56:24:20 |

TABLE 6

| EX | Mn of the arm g/mol | wt % T-21 | Average No. of arms | % conversion to star polymer | Mw of the star (1000's) | Mn of the star (1000's) | PDI |
|---|---|---|---|---|---|---|---|
| 26 | 26200 | 0.36 | 8 | 35 | 186.5 | 157.4 | 1.18 |
| 27 | 32700 | 0.29 | 8 | 55 | 373.3 | 289.9 | 1.29 |
| 28 | 30000 | 0.28 | 8 | 22 | 263.1 | 228.3 | 1.15 |
| 29 | 27600 | 0.28 | 9 | 38 | 363.8 | 311.2 | 1.17 |

Examples 30: Star Polymer with Amine Functionality

The process is the same as described in examples 1-14, except the copolymer formed is C12 to C15 methacrylate (78.2% wt), methyl methacrylate (20.1% wt), dimethylaminopropyl methacrylamide (1.8% wt) terpolymer. Table 7 presents characterization data for the polymer formed:

TABLE 7

| Example | Average No. of Arms | Mw of the star (1000's) | Mn of the star (1000's) | PDI |
|---|---|---|---|---|
| 30 | 12 | 24.04 | 14.87 | 1.62 |

Example 31 ATRP Polymers: C12 to C15 Methacrylate Copolymer 209.95 g of mixed dodecyl/pentadecyl methacrylate (0.75 mol) (C12/15 methacrylate) and 143.5 g of Chevron 120N UCB oil of lubricating viscosity are charged to a 500 ml flange flask equipped with a single bladed stirrer, reflux condenser and internal eurotherm thermometer. 0.14 g (0.6 mmol) of (-)-sparteine followed by 0.043 g (0.3 mmol) of copper (1) bromide (CuBr) is charged to the vessel. The vessel is purged with nitrogen for 15 minutes before heating the solution from room temperature to 95° C. Once the desired temperature is reached, 0.58 g (0.3 mmol) of ethyl bromoisobutyrate is added to the vessel. The reaction mixture is stirred at 95° C. for 9 hours. 3.9 g (30 mmol) of divinyl benzene is added to the reaction vessel and the reaction stirred at 95° C. for a maximum of 9 hours. The stirring is stopped and the solution filtered through diatomaceous earth to remove catalyst particulates.

Example 32 ATRP Polymers: 2-Ethylhexyl Methacrylate Copolymer 146.35 g (0.52 mol) of mixed dodecyl/pentadecyl methacrylate and 63.65 (0.32 mol) of 2 ethylhexyl methacrylate and 143.5 g of Chevron 120N UCB oil of lubricating viscosity are charged to a 500 ml flange flask equipped with a single bladed stirrer, reflux condenser and internal eurotherm thermometer. 0.14 g (0.6 mmol) of (-)-sparteine followed by 0.043 g (0.3 mmol) of copper (1) bromide (CuBr) is charged to the vessel. The vessel is purged with nitrogen for 15 minutes before heating the solution from room temperature to 95° C. Once the desired temperature is reached 0.58 g (0.3 mmol) of ethyl bromoisobutyrate is added to the vessel. The reaction mixture is stirred at 95° C. for 9 hours. 4.4 g (34 mmol) of divinyl benzene is added to the reaction vessel and the reaction stirred at 95° C. for a maximum of 9 hours. The stirring is stopped and the solution filtered through diatomaceous earth to remove catalyst particulates.

Example 33 Nitroxide Mediated Polymers: C12 to C15 Methacrylate Copolymer 111.6 g (0.4 mol) of mixed dodecyl/pentadecyl methacrylate and 62.4 (0.6 mol) of styrene and 58 g of Chevron 120N UCB oil of lubricating viscosity is charged to a 250 ml flange flask equipped with a single bladed stirrer, reflux condenser and internal eurotherm thermometer. The vessel is purged with nitrogen for 15 minutes before the addition of 0.3 g (14 mmol) of Triganox™ 21 and 0.21 g (14 mmol) of 2,2,6,6-tetramethyl-1-piperidinyloxy free radical (TEMPO). The solution is heated from room temperature to 120° C. and stirred for 9 hours. 5.2 g (40 mmol) of divinyl benzene is added to the reaction flask and the solution stirred at 120° C. for a maximum of 9 hours.

Preparative Example 1: Preparation of 2,2,5-Trimethyl-4-phenyl-3-azahexane-3-nitroxide 2,2,5-Trimethyl-4-phenyl-3-azahexane-3-nitroxide is prepared using the methodology described in Marcromolecules 2000 33, 363. The structure of the nitroxide is

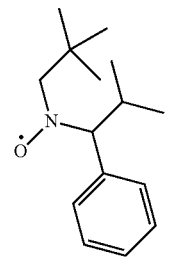 [SMILES: CC(C)C(c1ccccc1)N(O)CC(C)(C)C]

Example 34 Nitroxide Mediated Polymer: 2-Ethylhexyl Methacrylate 167.4 g (0.6 mol) of dodecyl pentadecyl methacrylate and 41.6 (0.4 mol) of styrene and 69 g of Chevron 120N UCB oil of lubricating viscosity are charged to a 250 ml flange flask equipped with a single bladed stirrer, reflux condenser and internal eurotherm thermometer. The vessel is purged with nitrogen for 15 minutes before the addition of 0.3 g (14 mmol) of Triganox 21 and 0.31 g (14 mmol) of 2,2,2-trimethyl-4-phenyl-3-azahexane-3-nitroxide. The solution is heated from room temperature to 125° C. and stirred for 9 hours. 5.2 g (40 mmol) of divinyl benzene is added to the reaction flask and the solution stirred at 120° C. for a maximum of 9 hours.

Examples 35 to 47: RAFT Polymers Prepared with Ethylene Glycol Dimethacrylate Examples 35 to 47 are prepared by similar process as Examples 1-14, except ethylene glycol dimethacrylate is used instead of DVB. The mole % ratio of ethylene glycol dimethacrylate to polymer arms in resultant star polymer is 3:1 unless otherwise stated. Typically the polymers are prepared in 30 to 40 wt % of base/diluent oil. The results obtained for average weight molecular weight (Mw), number average molecular weight (Mn), the polydispersity (PDI) as measured by gel permeation chromatography (GPC), the average number of arms on the star polymer and the percentage conversion to star polymer is based on the amount of polymer arm converted to the star polymer are shown in Table 8:

TABLE 8

| | Polymer Composition of Polymer Arms (wt % of monomer) | | | | Mn of the arm | Average No. of | | Star Polymer Mw | Star Polymer Mn | |
|---|---|---|---|---|---|---|---|---|---|---|
| EX | A | B | C | D | g/mol | arms | %** | (1000's) | (1000's) | PDI |
| 35 | 78.2 | 20 | 1.8 | 0 | 14,100 | 7 | 32 | 161.9 | 129.3 | 1.25 |
| 36 | 86 | 14 | 0 | 0 | 17,900 | 9 | 73 | 249 | 190.5 | 1.3 |
| 37 | 78.2 | 20 | 0 | 1.8 | 16,500 | 8 | 70 | 189.5 | 148.8 | 1.27 |
| 38[1] | 78.2 | 20 | 0 | 1.8 | 11,800 | 5 | 62 | 76.1 | 65.3 | 1.16 |
| 39[2] | 86 | 14 | 0 | 0 | 47,800 | 5 | 34 | 410.2 | 345 | 1.2 |
| 40 | 78.2 | 20 | 0 | 1.8 | 15,400 | 7 | 63 | 133.7 | 106 | 1.26 |
| 41 | 78.2 | 20 | 0 | 1.8 | 11,600 | 5 | 54 | 74.5 | 61.6 | 1.2 |
| 42[1] | 78.2 | 20 | 0 | 1.8 | 17,700 | 4 | 52 | 88.2 | 75.7 | 1.16 |
| 43 | 80 | 20 | 0 | 0 | 19,700 | 9 | 72 | 383.3 | 215.9 | 1.31 |
| 44 | 80 | 20 | 0 | 0 | 19,200 | 9 | 67 | 293.5 | 220.7 | 1.33 |
| 45 | 80 | 20 | 0 | 0 | 31,300 | 10 | 17 | 561.1 | 474.1 | 1.18 |

TABLE 8-continued

| EX | Polymer Composition of Polymer Arms (wt % of monomer) | | | | Mn of the arm g/mol | Average No. of arms | %** | Star Polymer Mw (1000's) | Star Polymer Mn (1000's) | PDI |
|---|---|---|---|---|---|---|---|---|---|---|
|  | A | B | C | D |  |  |  |  |  |  |
| 46[3] | 80 | 20 | 0 | 0 | 30,200 | 16 | 75 | 821.5 | 530.5 | 1.55 |
| 47 | 80 | 20 | 0 | 0 | 14,800 | 6 | 24 | 160.6 | 137.5 | 1.17 |

Footnote to Table 8
[1] polymer prepared from 1:1 mole % ratio of ethylene glycol dimethacrylate to polymer arms in resultant star polymer;
[2] polymer prepared from 4:1 mole % ratio of ethylene glycol dimethacrylate to polymer arms in resultant star polymer;
[3] polymer prepared from 7:1 mole % ratio of ethylene glycol dimethacrylate to polymer arms in resultant star polymer;
A is lauryl methacrylate;
B is maleic anhydride;
C is dimethylaminopropyl methacrylamide;
D is dimethylaminoethyl methacrylate; and
** is the conversion of polymer chain to star polymer.

Lubricating Composition Examples 1-47

Lubricating compositions 1 to 47 are prepared by blending the polymers of examples 1 to 47 respectively into 4 mm²/s PetroCanada base oil containing 0.2% by weight of a polymeric pour point depressant. The lubricating composition has an oil blend viscosity ranging from 8 to 12 mm²/s. The Kinematic and Brookfield viscosities are determined employing ASTM methods D445 at 100° C. and D2983 at −40° C. respectively. The viscosity index (VI) is also determined by employing the ASTM method D2270. The lubricating composition is also subjected to shear as determined by KRL tapered bearing shear stability test. The instrument is run for 20 hours with a 5000 N load, at 140° C. and at 1450 rpm. The viscosity data obtained from the test is described in ASTM method D445. The results obtained for examples 1 to 14 are shown in Tables 9 and 10.

TABLE 9

| Lubricating Composition Example | Polymer Example | Treat Rate (wt %) | BV −40 (1000's) | KV100 | Viscosity Index |
|---|---|---|---|---|---|
| 1 | 1 | 16.7 | 10.6 | 8.55 | 189 |
| 2 | 2 | 15.4 | 10.4 | 9.01 | 201 |
| 3 | 3 | 17.1 | 12.4 | 12.29 | 230 |
| 4 | 4 | 22.1 | 16.2 | 11.64 | 205 |
| 5 | 5 | 17.1 | 13.2 | 12.8 | 227 |
| 6 | 6 | 13.8 | 10.8 | 13.49 | 248 |
| 7 | 7 | 13 | 12.6 | 11.08 | 214 |
| 8 | 8 | 14.4 | 13.4 | 10.98 | 209 |
| 9 | 9 | 10.4 | 11.2 | 11.24 | 225 |
| 10 | 10 | 9.5 | 10.4 | 11.49 | 231 |
| 11 | 11 | 9 | 9.95 | 11.82 | 239 |
| 12 | 12 | 11.7 | 11.4 | 10.94 | 218 |
| 13 | 13 | 7.7 | 10.4 | 11.25 | 229 |
| 14 | 14 | 8.7 | 10.4 | 12.49 | 238 |

TABLE 10

| Oil Example | Polymer Example | Kinematic Viscosity at 100° C. after KRL Shear Test | Viscosity Loss After Shear | Shear Stability Index (SSI) |
|---|---|---|---|---|
| 1 | 1 | 7.92 | 7.4 | 15.87 |
| 2 | 2 | 7.98 | 11.4 | 23.25 |
| 3 | 3 | 10.01 | 18.5 | 29.57 |
| 4 | 4 | 9.63 | 17.3 | 28.47 |
| 5 | 5 | 9.16 | 28.4 | 44.28 |
| 6 | 6 | 8.55 | 36.6 | 55.44 |
| 7 | 7 | 7.76 | 30.0 | 51.08 |
| 8 | 8 | 8.26 | 24.9 | 42.50 |
| 9 | 9 | 7.55 | 32.6 | 55.41 |
| 10 | 10 | 7.15 | 38.0 | 62.81 |
| 11 | 11 | 7.1 | 40.1 | 65.19 |
| 12 | 12 | 7.39 | 32.4 | 55.82 |
| 13 | 13 | 6.81 | 39.5 | 66.57 |
| 14 | 14 | 6.87 | 45.0 | 71.05 |

Automatic Transmission Fluid Lubricating Compositions 1 to 47

Automatic Transmission fluid lubricating compositions 1 to 47 (ATF Examples) are prepared by blending the polymers into an available ATF fluid to provide an oil of lubricating viscosity to an oil blend viscosity at 100° C. of 7.0-7.2 mm²/s. This oil further contains a commercially available dispersant-inhibitor package. Viscometric and shear experiments are carried out as described for lubricating compositions 1 to 47. The results obtained for several of these compositions are presented in Tables 11 and 12.

TABLE 11

| ATF Example | Polymer Example | Treat Rate (wt %) | BV −40 (1000's) | KV100 | Viscosity Index |
|---|---|---|---|---|---|
| 30 | 30 | 5.9 | 5.26 | 7.2 | 255 |
| 15 | 15 | 10.26 | -a- | 7.2 | 216 |
| 16 | 16 | 8.01 | 5.67 | 7.2 | 240 |
| 17 | 17 | 10 | 81.6 | 7.2 | 232 |

-a- denotes measurement not made.

TABLE 12

| ATF Example | Polymer Example | Kinematic Viscosity at 100° C. after KRL Shear Test | Viscosity Loss After Shear | Shear Stability Index (SSI) |
|---|---|---|---|---|
| 15 | 15 | 6.0 | 14.5 | 31.4 |
| 16 | 16 | 5.85 | 21.9 | 35.3 |

Gear Oil Lubricating Compositions 1 to 47

Gear Oil lubricating compositions 1 to 47 are prepared by blending the polymers of Examples 1 to 47 respectively into a gear oil fluid.

In summary the invention provides a process for preparing a polymer and compositions thereof with dispersant, viscosity modifying properties, including low temperature viscometrics and shear stability.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration. As used herein any member of a genus (or list) may be excluded from the claims.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

a. hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

b. substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

c. hetero substituents, that is, substituents which, while having a predominantly hydrocarbon character, in the context of this invention, contain other than carbon in a ring or chain otherwise composed of carbon atoms; and d. heteroatoms include sulphur, oxygen, nitrogen, and encompass substituents as pyridyl, furyl, thienyl and imidazolyl. In general, no more than two, in one aspect no more than one, non-hydrocarbon substituent will be present for every ten carbon atoms in the hydrocarbyl group; typically, there will be no non-hydrocarbon substituents in the hydrocarbyl group.

What is claimed is:

1. A composition comprising:
    (a) a star polymer obtainable by a controlled radical polymerisation process, said polymer comprising:
        (i) a core portion comprising a polyvalent (meth)acrylic monomer, oligomer or polymer thereof or a polyvalent divinyl non-acrylic monomer, oligomer or polymer thereof, wherein the core portion comprises a functional group having the formula

where Y is —S—C(=S), $R^1$ is hydrogen, a linear or branched alkyl group containing 1 to 5 carbon atoms, and A is nitrogen or oxygen; and
        (ii) at least two arms of polymerised alkyl (meth)acrylate ester wherein the arms of the polymerized alkyl (meth)acrylate ester comprise
        (ii)(a) mixtures of an alkyl ester group containing 10 to 15 carbon atoms present in at least 50% to 100% of the alkyl groups;
        (ii)(b) an alkyl ester alkyl group containing 6 to 9 carbon atoms present at 0% to 20% of the alkyl groups;
        (ii)(c) an alkyl ester alkyl group containing 1 to 5 carbon atoms present at 0% to 30% of the alkyl groups;
        (ii)(d) an alkyl ester group containing 16 to 30 carbon atoms present at 0% of the alkyl groups; and
        (ii)(e) a nitrogen monomer present at 0 wt % of the arms; and
    (b) an oil of lubricating viscosity.

2. The composition of claim 1 wherein the star polymer comprises greater than about 7 arms.

3. The composition of claim 1 wherein the star polymer comprises greater than about 10 arms.

4. The composition of claim 1 wherein the polyvalent (meth) acrylic monomer is an acrylic or methacrylic acid polyol or a condensation product of a polyamine.

5. The composition of claim 4, wherein the polyvalent unsaturated (meth) acrylic monomer is ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, pentaerythritol tetraacrylate, 1,3-propanediol diacrylate, 1,5-pentanediol dimethacrylate, bis-acrylates and methacrylates of polyethylene glycols of molecular weight 200-4000, polycaprolactonediol diacrylate, pentaerythritol triacrylate, 1,1,1-trimethylolpropane triacrylate, pentaerythritol diacrylate, pentaerythritol triacrylate, pentaerythritol tetraacrylate, triethylene glycol diacrylate, triethylene glycol dimethacrylate, 1,1,1-trimethylolpropane trimethacrylate, hexamethylenediol diacrylate or hexamethylenediol dimethacrylate or an alkylene bis-(meth)acrylamide.

6. The composition of claim 1 wherein the nitrogen containing monomer is a vinyl substituted nitrogen heterocyclic monomer, a dialkylaminoalkyl (meth)acrylate monomer, a dialkylaminoalkyl (meth)acrylamide monomer, a tertiary-(meth)acrylamide monomer or mixtures thereof.

7. The composition of claim 1 wherein the nitrogen containing monomer comprises vinyl pyridine, N-vinyl imidazole, N-vinyl pyrrolidinone, dimethylaminoethyl acrylate, di methyl aminoethyl methacrylate, dimethylaminobutylacrylamide, dimethylamine propyl methacrylate, dimethylaminopropylacrylamide, N-vinyl caprolactam, dimethyl aminopropyl methacryl amide, dimethylaminoethyl acryl amide or mixtures thereof.

8. The composition of claim 1 wherein the polymeric arms of the star polymer have a polydispersity of about 2 or less.

9. The composition of claim 1 wherein the star polymer has a polydispersity of greater than about 2.

10. The composition of claim 1 wherein the star polymer has a weight average molecular weight $M_w$ of about 5000 to about 5,000,000.

11. The composition of claim 1 wherein the oil of lubricating viscosity is present in a concentrate forming amount.

12. The composition of claim 1 further comprising at least one other performance additive selected from metal deactivators, detergents, dispersants, viscosity index improvers other than the star polymer of the invention, extreme pressure agents, antiwear agents, antioxidants, corrosion inhibitors, foam inhibitors, demulsifiers, pour point depressants, seal swelling agents and mixtures thereof.

13. The composition of claim 1 further comprising a conventional poly(meth)acrylate viscosity index improver other than the star polymer of the invention, wherein the conventional poly(meth)acrylate is free of a functional group selected from a halogen, an —O—N= group and an S—C(=S)— group.

14. The composition of claim 1, wherein the star polymer is present in an amount from about 1 wt % to about 50 wt % of the composition; wherein the oil of lubricating viscosity is present in an amount from about 30 wt % to about 98.9 wt %; and wherein at least one other performance additive is present in an amount from about 0.01 wt % to about 20 wt % of the composition.

15. The composition of claim 1, wherein the composition is a transmission fluid, a gear oil, a hydraulic fluid or an internal combustion engine lubricant.

16. The use of the composition of claim 1, for a transmission fluid, a gear oil, a hydraulic fluid or an internal combustion engine lubricant, wherein the composition imparts at least one property comprising low temperature viscometrics, high temperature viscometrics, shear stability, dispersancy, viscosity index improving or mixture thereof.

17. The composition of claim 1, wherein the controlled radical polymerisation process is RAFT.

* * * * *